Sept. 18, 1962 C. A. ANDREWS ETAL 3,054,986

INFORMATION TRANSFER MATRIX

Filed Sept. 14, 1960 3 Sheets-Sheet 1

INVENTORS
CARROLL A. ANDREWS
DONALD G. FUGERE

BY Sughrue, Rothwell, Mion & Zinn
ATTORNEYS

INFORMATION TRANSFER MATRIX

Sept. 18, 1962 C. A. ANDREWS ETAL 3,054,986

INFORMATION TRANSFER MATRIX

Filed Sept. 14, 1960 3 Sheets-Sheet 3

3,054,986
Patented Sept. 18, 1962

3,054,986

INFORMATION TRANSFER MATRIX

Carroll A. Andrews, 5 Valley View Road, Poughkeepsie, N.Y., and Donald G. Fugere, Palmers Apts., Pleasant Valley, N.Y.

Filed Sept. 14, 1960, Ser. No. 56,027
9 Claims. (Cl. 340—172.5)

This invention relates to transfer matrices and more particularly to a matrix for transferring information from a particular storage location to a plurality of storage locations.

In data processing and computer systems it is often necessary to make parallel transfers of digital information between the registers or other logical operating components at a high speed and, if necessary, to make the parallel transfer to several locations at the same time. Prior art transfer devices have not been entirely satisfactory from the standpoint of reliability and speed. In many applications it is desirable to use magnetic core circuitry because of the attendant advantages of reliability, speed and packing density of this type of circuitry.

Further, it is desirable in many applications that the transfer circuitry be capable of not only transferring information from a particular storage location to one or a plurality of other storage locations but also of complementing the transfer information or of shifting information from bit position to bit position of a particular storage location. In the transfer of information it is also sometimes desirable to read the information back to the same register from which it was transferred in order that a non-destructive read-out of a storage location may be provided.

Accordingly, it is an object of this invention to provide an improved magnetic core transfer matrix for transferring information in parallel between a particular storage location and one or a plurality of other storage locations.

It is a further object of this invention to provide an improved magnetic core transfer matrix for transferring the complement of information stored in a particular storage location to one or a plurality of other storage locations.

It is a further object of the present invention to provide an improved magnetic core transfer matrix for shifting information from bit position to bit position of a particular storage location.

It is a still further object of the present invention to provide improved driving circuits for the magnetic core transfer matrix.

These and other objects and advantages of the present invention will become more apparent from the following description and appended claims taken in conjunction with the drawings in which:

In accordance with one embodiment of the present invention a transfer matrix consisting of two columns of magnetic cores with transistors connected to the output windings of each is provided. Each bit position of the registers between which information is to be transferred consists of two cores with a transistor on the output winding of each core. These two cores are designated the "1" core and the "0" core. An input to the register sets either the "1" or the "0" core. When the cores of the register are driven to the reset condition the voltage on the output windings of the cores will be such that the transistor connected to the output winding of a set core will be switched to the conducting condition. The outputs of transistors associated with the "1" cores of the registers are connected to the inhibit windings on one column of cores in the transfer matrix while the outputs of transistors associated with "0" cores are connected to inhibit windings on the other column of cores. The read-out of a binary 1 from a register inhibits one column of cores while the read-out of a binary 0 inhibits the other column. Simultaneously, a particular pair or particular pairs of cores in the transfer matrix are driven with set current. The core in each pair which is not inhibited will be set. The output windings of this particular pair of magnetic cores in the transfer matrix are connected to the register to which information is to be transferred. When the pairs of cores in the transfer matrix are driven with reset current, the information is transferred to the storage register. By setting and resetting more than one pair of cores in the transfer matrix, a simultaneous parallel transfer of information can be made to several storage locations.

Figure 1:
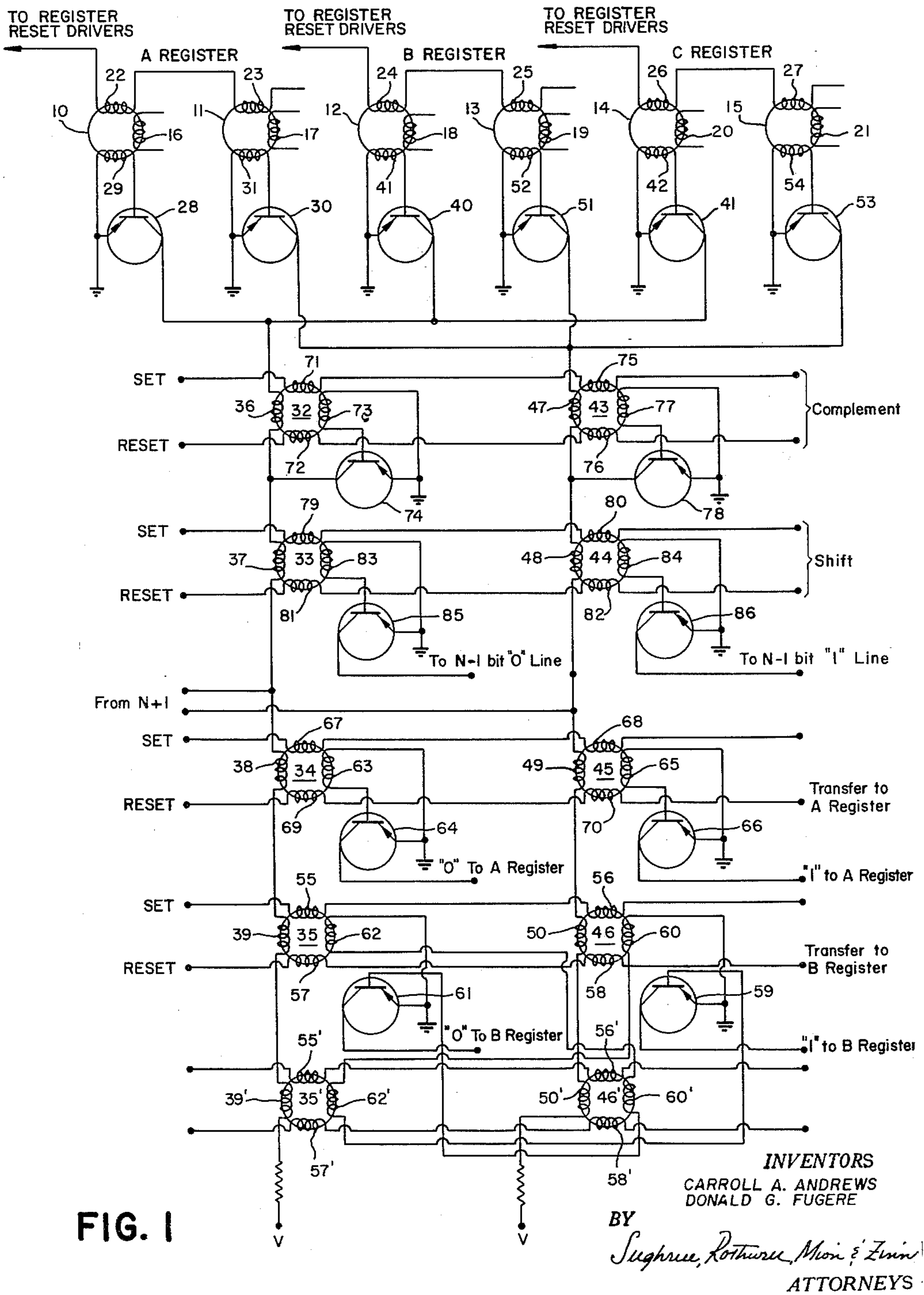
FIGURE 1 is a circuit diagram of the magnetic core transfer matrix of the present invention.

Referring to FIGURE 1, there is shown a single bit position for three storage locations, designated the A register, the B register and the C register. Magnetic cores 10 and 11 make up the first bit position of the A register. Similarly, magnetic cores 12 and 13 make up the first bit position of the B register and magnetic cores 14 and 15 make up the first bit position of the C register. may include several additional bit positions which are interconnected in a manner similar to the interconnections of FIGURE 1.

Information is stored in the A, B and C register by setting one of the cores in each bit position. The windings 16 through 21 are used to set information into the bit positions shown. If a 1 is to be stored in the first bit position of the A register, a set pulse is applied to the winding 16 and the core 10 is set. If a 0 is to be stored in the first bit position of the A register, a pulse is applied to winding 17 and the core 11 is set. Similarly, a 1 is stored in the first bit position of the B register by setting the core 12 and a 0 is stored in the first bit position of register B by setting the core 13.

When the information in a particular register is to be read out, a reset pulse is applied to the reset windings on all of the cores in that particular register. For example, if the A register is to be read out a reset pulse is applied by the register reset drivers to the windings 22 and 23. Similarly, if the B register is to be read out a reset pulse is applied to windings 24 and 25. The first bit position of the C register has reset windings 26 and 27.

In order to sense the information stored in each bit position of the register which is to be read out, a transistor is connected to the output winding of each magnetic core. A transistor inhibit driver 28 is connected to the output winding 29 of the core 10 and a transistor inhibit driver 30 is connected to an output winding 31 of the core 11. These transistors are normally biased in the non-conducting condition. However, when a core is driven from the set to the reset condition the transistor connected to the output winding of that core will conduct. For example, if the core 10 has been set, indicating that a 1 has been stored in the first position of the A register, the transistor inhibit driver 28 will conduct when a reset pulse applied to cores 10 and 11 resets the core 10. The transistor 28 then causes current to flow through inhibiting windings on a row of magnetic cores including cores 32 through 35' in the transfer matrix. That is, the current from transistor 28 flows through the inhibit windings 36 through 39'.

A transistor 40 is also connected to an output winding 41 on magnetic core 12 which stores the 1 condition of the first bit position of register B. If upon the occurrence of a reset pulse through reset windings 24 and 25, the core 12 is switched from the set to the reset condition, the transistor inhibit driver 40 will cause current to flow through inhibit windings 36 through 39' on the first row of cores in the transfer matrix. A transistor inhibit driver 41 is also connected to an output winding 42 on the core 14 which stores the 1 condition of the first position of the C register. The output of transistor inhibit driver 41 is also connected to the inhibit windings 36 through 39' on the first row of cores in the transfer matrix. In a similar manner the inhibit drivers associated with the "1" cores of the first bit position of all registers are ORed together and the output is connected to the inhibit windings on the first row of cores in the transfer matrix.

While the inhibit drivers 28, 30, 40, 41, 51 and 53 have been shown as simple transistor drivers, under certain circumstances it may be desirable to provide regenerative drivers within over-ride shut-off control. That is, for timing purposes it may be desirable to provide inhibit drivers which remain in the conducting condition until they are turned off by an external control signal.

If, at the time that the A register is to be read-out, a 0 has been stored in the first bit position of the A register, the core 11 will be switched from the set to the reset condition thereby turning on the transistor inhibit driver 30. When the transistor 30 is turned on current is supplied to inhibit windings on the second row of cores, including the cores 43 through 46', in the transfer matrix. The current flows through from transistor 30 through inhibit windings 47 through 50' which are connected in series.

If a 0 has been stored in the first bit position of the B register when the B register is read out, a transistor inhibit driver 51, connected to an output winding 52 on the core 13, will conduct, thus supplying current to the inhibit windings on the second rows of cores in the transfer matrix. Similarly, if a 0 has been stored in the first bit position of the C register when the C register is read out a transistor inhibit driver 53, connected to an output winding 54 on the core 15, will supply current to the inhibit windings on the second row of cores in the transfer matrix.

In order to transfer the information read out of a register to the desired register or registers, the magnetic cores in the transfer matrix are divided into pairs and each pair of cores is associated with a register to which information is to be transferred. For example, the pair of cores 35 and 46 are used to transfer information to the B register. If a 1, stored in the first bit position of register A, is to be transferred to the first bit position of register B, then, upon the occurrence of a reset pulse to register A, the transistor inhibit driver 28 will cause the current to flow through inhibit winding 39 on core 35. Simultaneously, a set pulse is applied to the set windings 55 and 56 on cores 35 and 46, respectively. Since the core 35 is inhibited by current flowing through the inhibit winding 39, only the core 46 will be set.

After core 46 has been set, a reset pulse is applied to the reset windings 57 and 58 on the cores 35 and 46, respectively. Upon the ocurrence of this reset pulse, the core 46 is switched from the set to the reset condition. This switch in condition causes the transistor driver 59, connected to output winding 60 on core 46, to conduct. The collector of transistor 59 is connected to the 1 core of the first bit position of register B. When transistor 59 is turned on the 1 core of register B is set thereby inserting a 1 into the first bit position of register B. Therefore, the transfer of a binary 1 from the first bit position of register A to the first bit position of register B is complete. It should be noted that because the core 35 was not set there will be no switch in state when a reset pulse is applied to the core and therefore, transistor 61, connected to output winding 62 on core 35, will not be turned on. The collector of this transistor is connected to the 0 core of the first bit of the B register. If a 0 had been transferred from register A to register B, the transistor driver 61 would conduct current and set the 0 core of the first position of the B register.

The pair of cores 34 and 45 are used to transfer information to the A register. An output winding 63 on core 34 is connected to transistor driver 64. The collector of this transistor is connected to the 0 core of the first bit position of the A register. Similarly, an output winding 65 on core 45 is connected to a transistor driver 66. The connector of this transistor is connected to a winding on the 1 core of the bit position of the A register. Cores 34 and 45 are provided with set windings 67 and 68 and reset windings 69 and 70 similar to those provided on cores 35 and 46.

A pair of cores, such as the pair 34 and 45 and the pair 35 and 46, is provided for each register to which information is to be transferred. Additionally, a pair of cores 32 and 43 is provided to complement information which is to be transferred to another register. The core 32 is provided with a set winding 71, a reset winding 72 and an output winding 73 which is connected to a transistor driver 74 in a manner similar to that previously described. The core 43 is also provided with a set winding 75, a reset winding 76 and an output winding 77 which is connected to a driver transistor 78.

The operation of the cores 32 and 43 in complementing a bit which is to be transferred to another register is as follows. Assuming that the information in the A register is to be complemented, the A register is reset and current will thus flow through inhibit winding 36 or inhibit winding 47 depending upon whether a 1 or a 0 was stored in the A register cores. At the same time a set current is applied to windings 71 and 75 of the complement cores 32 and 43. If a 1 were in the register then core 43 will be set, since inhibit current is flowing in winding 36. After the set is over a reset of the complement cores 32 and 43 occurs. Since core 43 was set, the transistor 78 connected to the output winding 77 will be turned on at reset time and cause current to flow from the collector of transistor 78 to the inhibit windings 48, 49 and 50. Now a set current is applied to windings 67 and 68 on the cores 34 and 45 associated with the transfer of information to the A register. A reset of these two cores then occurs causing one of the transistors 64 or 66 to be turned on thus setting one of the cores in the first bit position of the A register. Thus the A register has been complemented. It should be noted that the complement could have been transferred to any of the other registers. For example, if the cores 35 and 46 had been set and reset the complement would have been transferred to the B register.

It is often desirable to transfer a complement directly to a particular register instead of complementing in two steps as described above. It may be necessary to frequently transfer a complement to a particular register and means may be provided to make this complement transfer without going through the extra timing cycle required when the complement transfer is performed by the complement cores 32 and 43. In order to do this, another pair of cores such as 35'—46' must be provided. As shown, these cores make a direct complement transfer to register B.

The operation of the cores 35'—46' in making a complement transfer directly to register B is as follows. If the complement of a 1, stored in the first bit position of register A is to be transferred to the first bit position of register B, then, upon the occurrence of a reset pulse to register A, the transistor inhibit driver 28 will cause current to flow through inhibit winding 39' or core 35'. Simultaneously, a set pulse is applied to the set windings 55' and 56' on cores 35' and 46', respectively. Since the core 35' is inhibited by current flowing through the inhibit winding 39', only the core 46' will be set. A reset pulse is then applied to the windings 57' and 58'. The reset pulse switches the core 46' from the set to the reset condition and this switch in condition causes transistor driver 61, connected to output winding 60', to conduct. The collector of transistor 61 is connected to the 0 core of the first bit position of register B. When transistor 61 is turned on a 0 is set into the first bit position of register B. Thus, the complement of the information stored in the first bit position of register A has been transferred to the first bit position of register B. While this direct transfer technique has advantages in that there is a saving in the time required to complete the operation, it has the disadvantage that an extra pair of cores must be provided for each bit position to which a complement is to be transferred.

In accordance with this invention it is possible to simultaneously transfer information in parallel from a register to a plurality of registers. In order to do this the pair of cores in the transfer matrix associated with each of the registers to which information is to be transferred are simultaneously set and then reset. It is also possible at the same time to transfer information back into the register from which it was read out. For example, if information is read out of the A register and one of cores 34 and 45 is set and reset the information will be read back into the A register. By this means a nondestructive read-out is accomplished.

In accordance with this invention it is also possible to shift information from bit position to bit position in a particular register. For example, the cores 33 and 44 are used to shift information from the first bit position of a register to the second bit position of a register. These cores, 33 and 44, are provided with set windings 79 and 80, reset windings 81 and 82 and output windings 83 and 84. The output winding 83 of core 33 is connected to a transistor driver 85 and the output winding 84 of core 44 is connected to a transistor driver 86. The outputs of these transistors, 85 and 86, are connected to the inhibit windings of the corresponding bit position.

Figure 2:
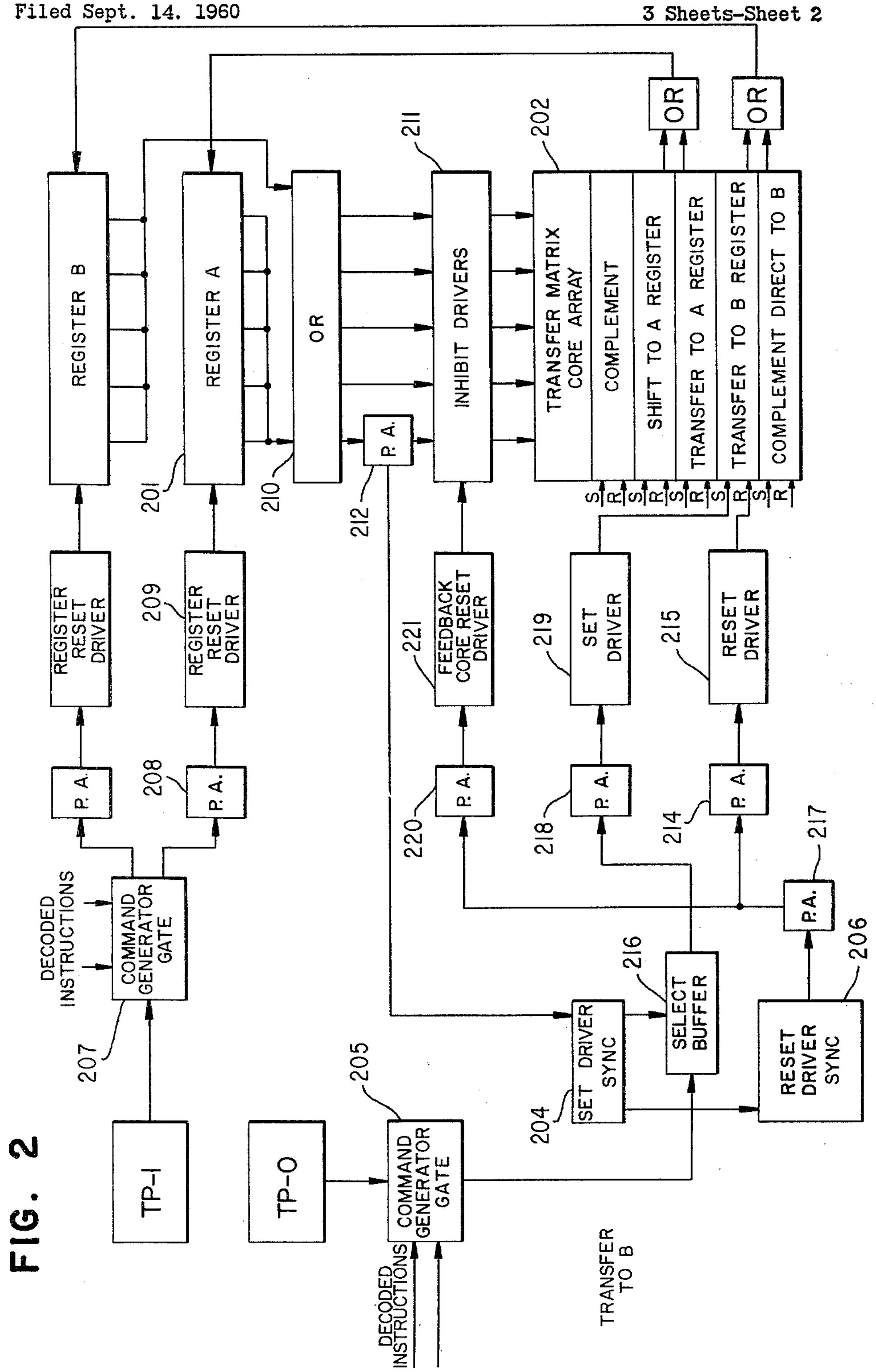
FIGURE 2 is a block diagram of the driving circuits for the magnetic core transfer matrix of the present invention.

Referring to FIGURE 2, there is shown the driving circuits for a matrix position. The driving circuits of FIGURE 2 are used to transfer the contents of storage of register A, shown as register 201 in FIGURE 2, to transfer matrix 202. This transfer takes place under command of a command generator which issues a signal indicating that register A is to be read out. At some timing pulse prior to the time at which it is desired to read-out register A, a pulse is applied to a select buffer circuit 216. This pulse, designated TP–0, is connected through command generator gate 205 under control of the decoded instructions from the command generator to the select buffer 216. TP–0 occurs one pulse period before TP–1 which is to be used to read out register A. The pulse applied through gate 205 to the select buffer 216 causes a magnetic core in this circuit to be set. The transfer matrix position is now in the "ready to go" state.

Figure 3:
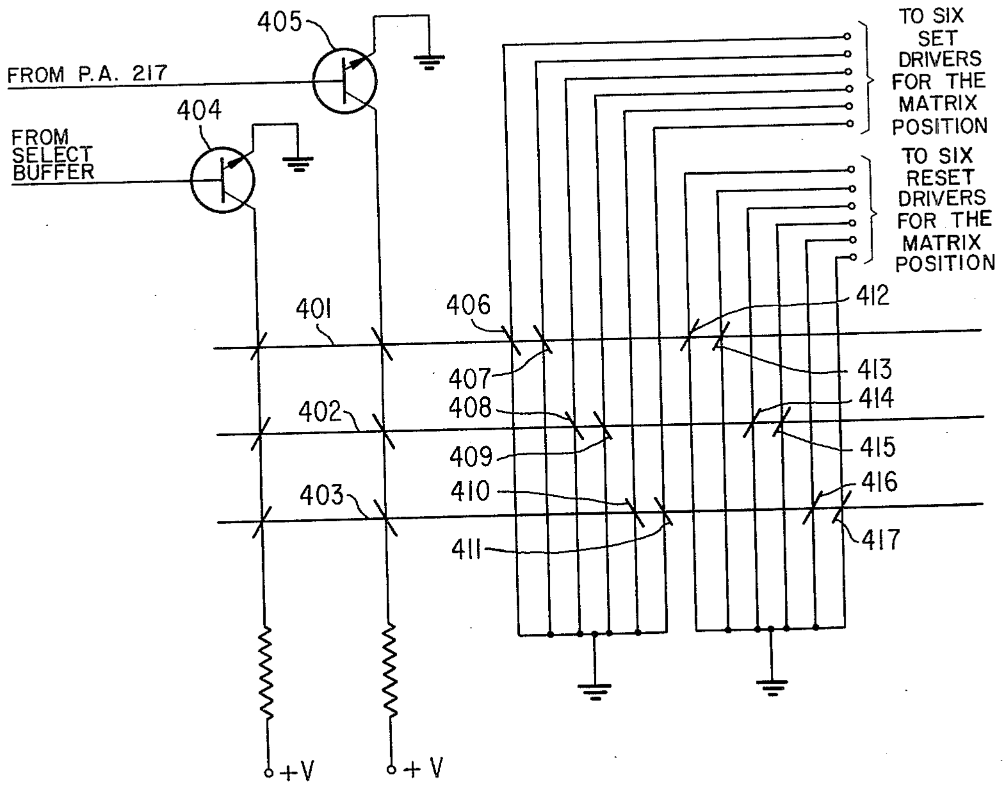
FIGURE 3 is a circuit diagram of two pulse amplifiers in the driving circuitry.

At the subsequent time, TP–1, the command generator, supplies a decoded instruction which acts through the gate 207 to actuate pulse amplifier 208. Pulse amplifier 208 in turn actuates the register reset drivers 209 and these apply a reset pulse to the cores of the various bit positions of register A. The outputs of the register, with the exception of bit 1, pass through a diode OR circuit 210 to the transistor inhibit drivers 211. Bit 1 energizes a pulse amplifier 212 which in turn energizes the inhibit driver of bit 1 as well as causing the core in the set driver sync 204 to be set. Upon the setting of the set driver sync core, an output is passed to the select buffer 216. This signal resets the core in select buffer 216, the output of which acts through pulse amplifier 218 to turn on the set driver 219. The signal from the set driver sync 204 also energizes the reset driver sync 206. The reset driver sync 206 includes a delay such that a predetermined time after the reset driver is energized, it will produce a pulse output which acts through pulse amplifier 217 and pulse amplifier 214 to turn on the reset driver 215. As mentioned previously, provision may be made for turning the inhibit drivers 211 off by an external control signal. The output of pulse amplifier 217 provides this external control signal and it acts through pulse amplifier 220 and feedback core reset drivers 221 to turn off the inhibit drivers. The details of pulse amplifiers 214 and 218 are shown in FIGURE 3. The resetting of the core in the select buffer 216 switches transistor 404 to the conducting state. The transistor 404 sets the cores 401, 402 and 403. This setting of the cores 401—403 is sensed by windings 406—411 and these windings turn on the set drivers for the matrix position. This completes the operation of setting the matrix up.

The cores 401—403 are reset in response to an output of pulse amplifier 217. When these cores are reset by transistor 405, the resetting of the cores is sensed by windings 412—417, the outputs of which turn on the reset drivers for the matrix position.

While certain specific embodiments of this invention have been shown and described it will, of course, be understood that various other modifications may be made. The appended claims are, therefore, intended to cover any such modifications within the true spirit and scope of the invention.

What we claim as new and desire to secure by Letters Patent of the United States is:

1. Circuitry for transferring two-state information between a plurality of storage locations comprising a plurality of pairs of cores of magnetic material having a high remanence characteristic, each of said magnetic cores having a set, a reset, an inhibit, and an output winding thereon, the output windings of each pair of magnetic cores being connected to a particular storage location to which information is to be transferred, means for sensing a first state of a storage location from which information is to be transferred, means responsive to said sensing means for driving the inhibit windings of a first of each pair of said magnetic cores, means for sensing a second state of a storage location from which information is to be transferred, means responsive to said last named sensing means for driving the inhibit windings of a second of each pair of said magnetic cores, means for driving the set windings of particular pairs of cores whereby the cores which are not inhibited are driven to the set condition and whereby information is transferred to the storage locations to which the output windings of said particular pairs of cores are connected.

2. Circuitry for transferring two-state information from a first register to a second register each of which includes magnetic cores which may be conditioned to the "1" state or to the "0" state, each of said cores being of a magnetic material having a high remanence characteristic, said circuitry comprising a matrix of pairs of transfer magnetic cores, each of said transfer magnetic cores being of a magnetic material having a high remanence characteristic, each of said transfer magnetic cores having a set, a reset, an inhibit and an output winding thereon, the output windings of said transfer magnetic cores being connected to the second storage register, means for sensing a "1" condition of the magnetic cores of said first register, means responsive to said sensing means for driving the inhibit windings of a first core of each pair of transfer magnetic cores, means for sensing a "0" condition of the magnetic cores of said first register, means responsive to said last named sensing means for driving the inhibit windings of the second cores of each pair of transfer magnetic cores, means for driving the set windings of said magnetic cores whereby the core which is not inhibited is driven to the set condition and whereby information is transferred to said second register.

3. Circuitry for transferring two-state information between a plurality of storage locations, each of said storage locations including first and second magnetic cores with substantially square hysteresis loops for representing the "1" or "0" contents of the storage location, said circuitry comprising a plurality of pairs of transfer magnetic cores, each of said transfer magnetic cores having a set, a reset, an inhibit and an output winding thereon, the output windings of each pair of transfer magnetic cores being connected to said first and said second magnetic core of a storage location to which information is to be transferred, said first magnetic core in the storage location from which information is to be transferred having an output winding, means for resetting said first and second magnetic cores in the storage location from which information is to be transferred, said output winding on said first magnetic core producing a pulse output when said storage location is in a first state, means responsive to said pulse output for driving the inhibit windings of a first of each pair of said transfer magnetic cores, said second magnetic core of said storage location from which information is to be transferred having an output winding thereon, said output winding producing a pulse output upon the resetting of said magnetic cores in said storage location when a second state of information has been stored in said storage location, means responsive to said output pulse from said second output winding for driving the inhibit windings of a second of each pair of said magnetic cores, means for driving the set windings of particular pairs of magnetic cores whereby the cores which are not inhibited are driven to the set condition and whereby information is transferred to the storage locations to which the output windings of said particular pairs of cores are connected.

4. The transfer circuitry recited in claims 3 wherein the means responsive to the pulse outputs for driving the inhibit windings comprise a plurality of transistor drivers.

5. Circuitry for storing and transferring binary data comprising a first, second and third storage means each of which includes first and second magnetic cores having substantially square hysteresis loops for representing the "1" or "0" condition of the storage means, a matrix of magnetic cores including a plurality of pairs of cores, said first, second and third storage means being responsive to a respective pair of cores, each core in the matrix having an inhibit winding and a set winding, means for applying an inhibit pulse to the inhibit winding of one core in each pair whenever a "1" is read out of said first, second or third storage means and means for applying an inhibit pulse to the inhibit windings of the other cores of each pair whenever a "0" is read out of said first, second or third storage means, means for applying set current to the set windings on a selected pair of cores related to one of said first, second or third storage means to which it is desired to transfer data, reset means for resetting the selected pairs of cores, and output means on each core of said pairs of cores for sensing the reversal of flux upon resetting said pairs of cores by said reset means and for applying an output pulse to said selected storage means.

6. Circuitry for transferring binary information between a plurality of storage locations each of which includes a first and a second magnetic core with a substantially square hysteresis loop for representing the "1" or "0" state of the storage location comprising a transfer matrix including a plurality of pairs of transfer cores, said plurality of storage locations each being associated with a respective pair of transfer cores, each core in the matrix having an inhibit winding and a set winding, means for applying an inhibit pulse to the inhibit winding of one core in each pair whenever a "1" is read out of said plurality of storage locations and means for applying an inhibit pulse to the inhibit windings of the other cores of each pair whenever a "0" is read out of one of said plurality of said storage locations, means for applying set current to the set windings on the particular pairs of cores associated with the storage locations to which information is to be transferred, reset means for resetting selected pairs of transfer cores, and output means on each core for sensing the reversal of flux within said core upon resetting said core by said reset means and applying an output pulse to said selected storage locations.

7. Circuitry for transferring binary information between a plurality of storage locations each of which includes first and second magnetic cores each having a substantially square hysteresis loop for representing the "1" or "0" states of information contained in the storage locations comprising register reset drivers for resetting all of said magnetic cores in a storage location from which information is to be transferred, a transfer matrix including a plurality of pairs of transfer cores each having a substantially square hysteresis loop, each of said cores having a set and reset condition, said plurality of storage locations each being associated with a respective pair of transfer cores, each transfer core having an inhibit winding, and a set winding, a first plurality of transistor inhibit drivers, each of said first plurality of inhibit drivers being responsive to the switching of said first magnetic cores in each storage location from the set to the reset condition for providing drive current to the inhibit windings on the first core of each pair of transfer cores, a second plurality of transistor inhibit drivers, each of said second plurality of transistor inhibit drivers being responsive to the switching of second magnetic cores in each storage location from the set to the reset condition for providing driving current to the inhibit windings on the second core of each pair of transfer cores, a plurality of set drivers for applying current to the set windings of the particular pairs of cores associated with the storage locations to which information is to be transferred, a plurality of reset drivers for applying current to the reset windings of the particular pair of cores associated with the storage locations to which information is to be transferred, output windings on each transfer core for sensing the reversal of flux within said core upon resetting said cores and for applying an output pulse to said selected storage locations.

8. The transfer circuitry recited in claim 7 and driving circuits which operate in synchronism with a source of timing pulses, said driving circuits including a select buffer having a set and a reset condition, said select buffer being set one timing pulse before the time at which a transfer of information is to take place, said register reset drivers being enabled by the timing pulse which occurs at the time the transfer is to take place, said last-named timing pulse resetting said select buffer, said select buffer being connected to the set drivers associated with the registers to which information is to be transferred, said set drivers being enabled by the switching of said select buffer to the reset condition, a reset driver sync circuit, said reset driver sync circuit producing an output a predetermined time after being enabled, said reset driver sync circuit being enabled by the timing pulse which occurs at the time the transfer is to take place, the output of said reset driver sync circuit being connected to the reset drivers associated with the register to which information is to be transferred, said reset drivers being enabled by the output of said reset driver sync circuit.

9. The transfer circuitry recited in claim 8 wherein the select buffer includes a magnetic core having two stable states, said magnetic core being driven to one stable state when said select buffer is set and said magnetic core being driven to the other stable state when said select buffer is reset.

References Cited in the file of this patent

UNITED STATES PATENTS 2,935,738 Richards ---------------- May 3, 1960

UNITED STATES PATENT OFFICE
CERTIFICATE OF CORRECTION

Patent No. 3,054,986 September 18, 1962

Carroll A. Andrews et al.

It is hereby certified that error appears in the above numbered patent requiring correction and that the said Letters Patent should read as corrected below.

In the grant, lines 1 and 2, for "Carroll A. Andrews, of Poughkeepsie, New York, and Donald G. Fugere, of Pleasant Valley, New York," read -- Carroll A. Andrews, of Poughkeepsie New York, and Donald G. Fugere, of Pleasant Valley, New York, assignors to International Business Machines Corporation, of New York, N. Y., a corporation of New York, --; line 11, for Carroll A. Andrews and Donald G. Fugere, their heirs" read -- International Business Machines Corporation, its successors --; in the heading to the printed specification, lines 3 to 5, for "Carroll A. Andrews, 5 Valley View Road, Poughkeepsie, N. Y., and Donald G. Fugere, Palmers Apts., Pleasant Valley, N. Y." read -- Carroll A. Andrews, Poughkeepsie, N. Y., and Donald G. Fugere, Pleasant Valley, N. Y., assignors to International Business Machines Corporation, New York, N. Y., a corporation of New York --; column 2, line 28, after "register." insert -- It should, of course, be understood that each register --; column 3, line 19, for "within" read -- with an --; column 4, line 9, for "connector" read -- collector --; line 68, for "or" read -- of --; column 7, line 30, for "claims" read -- claim --; column 8, line 4, before "applying" insert -- for --.

Signed and sealed this 12th day of March 1963.

(SEAL)
Attest:

ESTON G. JOHNSON
Attesting Officer

DAVID L. LADD
Commissioner of Patents